(12) United States Patent
Fakher et al.

(10) Patent No.: US 12,240,125 B2
(45) Date of Patent: Mar. 4, 2025

(54) WORK APPARATUS HAVING UNDER-TABLE ROBOT

(71) Applicant: HELLA GMBH & CO. KGAA, Lippstadt (DE)

(72) Inventors: Shahriar Fakher, Lippstadt (DE); Miguel Lebrato-Rastrojo, Paderborn (DE); Thomas Albert Roebbecke, Erwitte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 635 days.

(21) Appl. No.: 17/146,004

(22) Filed: Jan. 11, 2021

(65) Prior Publication Data

US 2021/0129336 A1    May 6, 2021

Related U.S. Application Data

(63) Continuation of application No. PCT/EP2018/068609, filed on Jul. 10, 2018.

(51) Int. Cl.
*B25J 9/16* (2006.01)
*B25J 9/00* (2006.01)
*B25J 21/00* (2006.01)

(52) U.S. Cl.
CPC .......... *B25J 9/1676* (2013.01); *B25J 9/0096* (2013.01); *B25J 9/1666* (2013.01); *B25J 21/00* (2013.01); *G05B 2219/40202* (2013.01)

(58) Field of Classification Search
CPC ...... B25J 9/0096; B25J 9/1666; B25J 9/1674; B25J 9/1676; B25J 9/1694; B25J 9/1697;
(Continued)

(56) References Cited

U.S. PATENT DOCUMENTS

| | | | |
|---|---|---|---|
| 4,841,890 A * | 6/1989 | Tancs | D05B 51/00 112/273 |
| 5,386,762 A | 2/1995 | Gokey | |

(Continued)

FOREIGN PATENT DOCUMENTS

| | | |
|---|---|---|
| DE | 102010005708 A1 | 7/2010 |
| DE | 202015101621 U1 | 7/2016 |

(Continued)

OTHER PUBLICATIONS

Fortapache, "Singer Model 66 Sewing Machine with Treadle 1927", 2015, Collectors Weekly, https://www.collectorsweekly.com/stories/163620-singer-model-66-sewing-machine-with-trea (Year: 2015).*

(Continued)

*Primary Examiner* — Spencer D Patton
(74) *Attorney, Agent, or Firm* — Muncy, Geissler, Olds & Lowe, P.C.

(57) ABSTRACT

A work apparatus for semi-automatically carrying out work steps, having a work bench, which has a worktop and a collaborative work area arranged above the worktop, in which work steps may be carried out manually and automatically, a robot being arranged beneath the worktop for carrying out the automatic work steps, and at least one opening being present in the worktop, through which the work area is accessible for the robot.

21 Claims, 3 Drawing Sheets

(58) Field of Classification Search
CPC . B25J 21/00; B25J 11/00; B25J 11/003; B25J 11/0045; B25J 11/008; B25J 11/0095; G05B 2219/40202
See application file for complete search history.

(56) References Cited

U.S. PATENT DOCUMENTS

| | | |
|---|---|---|
| 8,315,735 B2 | 11/2012 | Nihei et al. |
| 2007/0017560 A1* | 1/2007 | Kiyota .............. H01L 21/67742 134/137 |
| 2013/0331989 A1 | 12/2013 | Umeno et al. |
| 2017/0314175 A1* | 11/2017 | Hirayama .............. D05B 35/00 |
| 2018/0193101 A1* | 7/2018 | Hashimoto ............ B25J 9/0009 |
| 2018/0222041 A1* | 8/2018 | Aoyama ................ B25J 9/0093 |
| 2019/0105779 A1 | 4/2019 | Einav |

FOREIGN PATENT DOCUMENTS

| | | |
|---|---|---|
| DE | 102016002781 A1 | 8/2016 |
| EP | 0306787 A1 | 3/1989 |
| EP | 2671687 A2 | 12/2013 |
| WO | WO2017163251 A2 | 9/2017 |

OTHER PUBLICATIONS

"Sewing factory with Singer machines," digitized 2015, New York Public Library Digital Collections, The Miriam and Ira D. Wallach Division of Art, Prints and Photographs: Photography Collection, https://digitalcollections.nypl.org/items/510d47d9-b51b-a3d9-e040-e00a18064a99 (Year: 2015).*
International Search Report dated Apr. 18, 2019 in corresponding application PCT/EP2018/068609.

* cited by examiner

WORK APPARATUS HAVING UNDER-TABLE ROBOT

This nonprovisional application is a continuation of International Application No. PCT/EP2018/068609, which was filed on Jul. 10, 2018, and which is herein incorporated by reference.

BACKGROUND OF THE INVENTION

Field of the Invention

The present invention relates to a work apparatus for semi-automatically carrying out work steps, comprising a workbench, which has a worktop and a collaborative work area arranged above the worktop, in which work steps may be carried out manually and automatically.

Description of the Background Art

The use of industrial robots is an essential element of today's industrial production of goods. Typical applications of industrial robots include, e.g. welding, bonding, coating, cutting, mounting, packaging, labeling, testing or conveying and processing. An industrial robot usually includes the following components: a load-carrying structure made up of rotational and translational axes, drive units arranged thereon, a manipulator head, for example a gripping system, a programmable controller for predefining the robot actions, as well as an internal sensor system for monitoring the position of the kinematic chain.

In the industrial manufacturing environment, the work areas of the robots, i.e. those spaces which are occupied by some part of the robots' load-carrying structures, drive units or manipulator heads during normal operation thereof, must traditionally be strictly safeguarded against the entry of people during their operation to protect them against industrial accidents with the robots. For this purpose, the work areas of the robots are usually surrounded by protective panels or enclosures and are possibly additionally monitored with the aid of sensors, e.g. light barriers.

During the course of ongoing automation efforts, the safety paradigm of strictly separate work areas for robots and people is, however, becoming increasingly replaced by a collaborative approach, which promotes a direct, physical interaction between humans and machines. The goal of this approach is, in particular, to increase manufacturing efficiency, for example in that the robot takes over physically strenuous activities for the human, so that the latter may concentrate more fully on his/her superior cognitive capabilities. To avoid industrial accidents in the work area used jointly by humans and machines, collaborative robots of this type are connected to an external sensor system, which supplies the robot controller with information about the position and movements of people or parts of they bodies working in the collaborative work area or in its surroundings, so that the controller is able to control the robot for direct interaction with a person for jointly carrying out work steps, on the one hand, and to enable the robot to instantaneously come to a standstill in accident-critical situation or to initiate other suitable safety measures.

The recommended protective measures for safely starting up industrial robots are discussed in the machinery directive DIN EN ISO 12100 and applied harmonized standards (DIN EN ISO 10218-1, ISO/TS 15066). According to the prior art, which is constituted, for example, by the unexamined patent applications WO 2017/163251 A2 and DE 10 2016 002 781 A1 as well as the utility model specification DE 20 2015 101 621 U1, apparatuses for the semi-automatic manufacturing of goods with a collaborative work area for robots and persons comprise a workbench having a worktop and a collaborative work area arranged above the worktop, which is accessible for a person standing or sitting in front of the workbench as well as for a robot. According to the prior art, the latter is mounted on top of the worktop or arranged above the worktop, e.g. mounted on a rear structure of the workbench or on a portal system. The collaborative work area is usually still surrounded by a protective enclosure, which encompasses a closable entrance for a person. A protective enclosure of this type represents a redundant safety measure, which additionally protects the work steps carried out by the robot autonomously and without direct collaboration with a human against accidents.

As discussed below, work apparatuses of this type according to the prior art involve a number of disadvantages with respect to flexibility and accessibility, standard time as well as investment costs and qualification requirements.

The arrangement of the robot on the worktop or on a rear panel of the workbench represents a greatly limiting basic condition for the material logistics when integrating the work apparatus into a production line. Such logistics comprise, for example, a material flow made up of introduced and removed structural elements as well as supplied components, which are to be mounted on the structural element in the work apparatus. The accessibility of the collaborative work area for the material logistics is significantly impaired by the presence of the robot on the worktop or on a rear panel, so that dimensioning of the space-consuming workbench may be necessary, in particular since the side of the work apparatus provided for access by persons must be kept free for safety reasons and should therefore not be used for material logistics.

Accessibility is improved, in principle, by using a portal system arranged above the workbench for accommodating the robot. The disadvantage of this variant of the prior art is the collaborative work area, which is significantly enlarged upwardly and which unavoidably also encompasses the particularly sensitive neck and head region of a collaborating person. In this case, therefore, more complex protective measures must be taken, e.g. a more complex external sensor system of a collaborative robot or larger enclosures. These particular design-specific disadvantages are directly reflected in a lack of flexibility of the work apparatus with respect to its ability to be integrated into different production environments, and they are thus also directly associated with high specific investment costs.

SUMMARY OF THE INVENTION

It is therefore an object of the present invention to provide an apparatus for semi-automatically carrying out work steps using a robot, which overcomes the aforementioned disadvantages of the prior art, i.e. in particular improves the accessibility of the collaborative work area and the flexibility with respect to the ability to integrate the apparatus. In particular, a sensor-monitored work area above the workbench is to be preferably made smaller.

In an exemplary embodiment, the robot is arranged in the work apparatus beneath the worktop, through which the robot gains access to the work area via at least one opening to be provided therein. The invention is based on the idea of significantly reducing the sensor-monitored, collaborative work area, so that measures to be provided for its protection are correspondingly optimized with respect to their complexity, their installation space and their investment costs.

This is achieved according to the invention in that the robot is arranged in the workbench beneath the worktop, from where it emerges into the collaborative work area only with one part of its structure, in particular a manipulator head, for the purpose of carrying out automatic work steps. At least one suitably dimensioned opening in the worktop is to be provided as access for the robot to the work area. A large part of the supporting structure and the drive units of the robot thus remain beneath the worktop while carrying out the automatic work steps, where it may be protected by very simple and cost-effective protective apparatuses, e.g. a laterally circumferential, rigid panel. The collaborative work area, which requires complex protection, is limited according to the invention to a significantly upwardly reduced volume above the worktop and is potentially penetrated only by the hands of a collaborating person or ideally only by a manually guided tool.

By relocating the robot beneath the worktop and reducing the installation space of protective devices for the collaborative work area, for example enclosures and sensor installations, the accessibility of the work apparatus for material logistics or other collaborating persons is increased, since the worktop is, in principle, flexibly accessible from all sides as well as from above. This furthermore results in an increased flexibility with regard to the ability to integrate the work apparatus into a larger work environment, which is further increased in that the more compact design, compared to apparatuses according to the prior art, also takes up less space overall.

The improved accessibility of the collaborative work area for material logistics and personnel results in further economical advantages over the course of operation, in that standard and execution times may be shortened, and the probability of errors occurring and the specific level of risk may be reduced Advantageous embodiments of the work apparatus according to the invention are also presented, which may be combined with each other in a suitable form.

The workbench should be dimensioned to be at least large enough that the robot is fully accommodated beneath the worktop in the installation volume thereof. Together with a protective enclosure laterally surrounding the workbench, a compact and closed-off design of the work apparatus may thus be implemented, whereby the latter is extremely suitable for integration into a larger work environment, e.g. a production line. The workbench may have, for example, the design of a paneled table, i.e. a worktop resting on four legs, with a panel surrounding the legs.

In an example, an articulated robot (also referred to as a jointed-arm robot) should be used as the robot. Articulated robots are industrial robots having a serial arrangement of typically 5 to 7 axes. Articulated robots are characterized by a high flexibility with respect to the work steps which may be carried out thereby, and they are able to perform multiple operations in a single pass. Depending on the complexity and specified execution time of the work steps to be carried out in the work apparatus according to the invention, the robot used may also include a plurality of articulated arms, in this case the dimensioning of the workbench and, in particular the number and/or size of the openings provided in the worktop for access to the collaborative work area having to be adapted.

To optimize the material logistics, for example when integrating the work apparatus into a production line, an intermediate holder may be provided, which is accessible from the collaborative work area, from the area beneath the worktop as well as from an area outside the work apparatus. An intermediate holder of this type may perform the function of a material lock, e.g. for introducing and removing a structural element and transporting components to be mounted on a structural element in the work apparatus. The intermediate holder should advantageously be designed as an edge-side recess in the worktop, so that the actual resting surface of the intermediate holder is arranged beneath the surface of the worktop. To ensure the required accessibility, the recess should be designed to be open on two sides, i.e. it should take on the shape of a rectangular cup, which is missing two opposing side surfaces, through which access takes place from an area outside the work apparatus and from the volume of the workbench beneath the worktop.

In a series arrangement of work apparatuses according to the invention, including edge-side intermediate holders, the transport of a workpiece or structural element may take place along the work apparatuses beneath their worktops, if the arrangement takes place in such a way that the intermediate holders are accessible for the robots of the adjacent work apparatus in each case. For this purpose, suitable manipulation means, for example grippers on an articulated arm, must be provided on the robot arranged beneath the worktop in each case, which receive a workpiece in an intermediate holder for the purpose of its transport, move it through the volume of the workbench beneath the worktop and place it down again on the next intermediate holder. Due to a procedure of this type, the execution time of the production process may be reduced, since the collaborative work area does not have to be penetrated for transporting workpieces or structural elements between the work apparatuses, and thus are available without limitations, for example for manual work steps to be carried out in parallel by a person.

The protection of the collaborative work area may take place with the aid of a light barrier system, for example in the form of a light grille. It should be installed in such a way that such objects are detected which penetrate the work area from areas to the side thereof or thereabove, in particular the limbs of a person reaching in. The light barrier system is to be connected to the controller of a robot and to be programmed in such a way that the robot is brought to a standstill by the controller upon detecting an object penetrating the work area, and/or further suitable safety measures are initiated, for example a de-energizing of the manipulator head.

Due to the advantage according to the invention of completely introducing the robot into the volume within the workbench beneath the worktop, and thus to be able to arrange it entirely outside the collaborative work area, the controller of the robot may be advantageous programmed in such a way that the penetration of the light grille, in particular by limbs of a person or by a tool guided by this person, while carrying out manual work steps, does not result in the robot situated completely beneath the worktop being brought to a standstill. This allows manual work steps to be carried out in the work area in parallel to the transport of a structural element by the robot beneath the worktop.

In a further advantageous specific embodiment, the work apparatus according to the invention may be suitable for simultaneously carrying out work steps by the robot and at least one person within the collaborative work area. For this purpose, a sensor system is to be provided, which carries out a position and movement detection of the body parts of the person introduced into the jointly used work area and simultaneously supplies the collected data to the controller of the robot, so that the latter may suitably adapt the movements and actions of the robot to the activity of the person.

A sensor system of this type may be based, in particular, on the optical recognition of markers. By means of triangulation, the marker positions may be calculated in three spatial dimensions, and the corresponding positions and movements of the marker-carrying objects may be inferred, e.g. with the aid of work gloves or tools provided with markers. The sensor system comprises a suitable installation of cameras as well as actively light-emitting or passive-reflective markers for the preferably seamless monitoring and triangulation of the collaborative work area.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
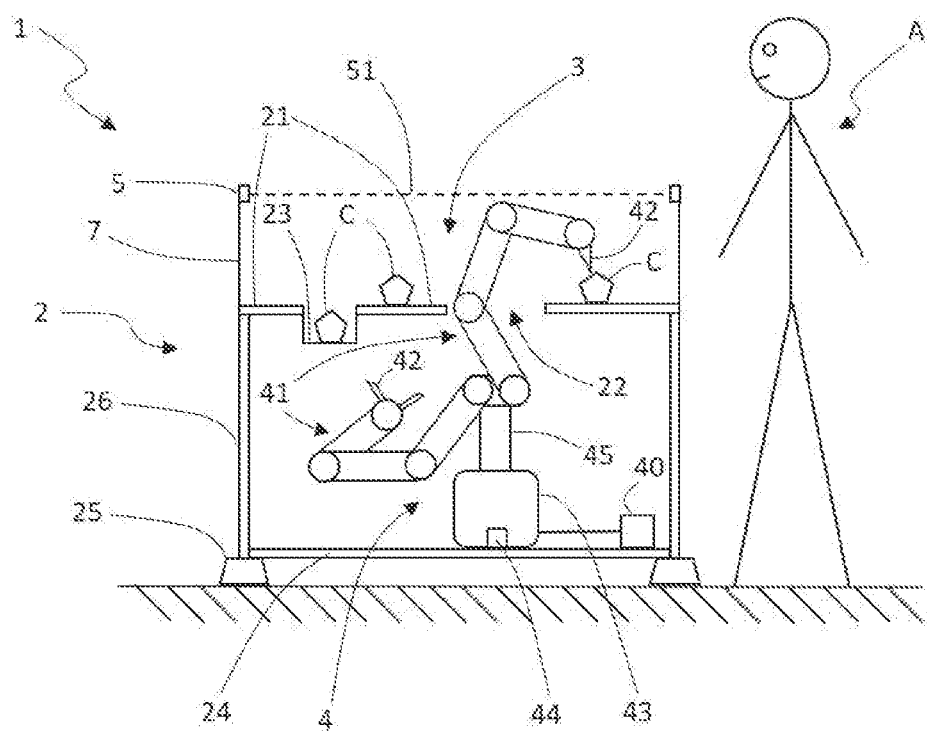
FIG. 1 shows a work apparatus according to the invention, including a robot which carries out automatic work steps in the collaborative area.

FIG. 1 shows a cross-section of a work apparatus 1 according to the invention, including a robot 4 which carries out automatic work steps in the collaborative area 3. Work area 3 extends above workbench 2, from the upper side of rectangular worktop 21 vertically upwardly, where it is limited by light grille 51 generated by light barrier system 5. Work area 3 is closed off laterally by side panels 7 and protected against access by person A. Corresponding side panels are also provided on the two sides of work area 3 situated in parallel to the figure plane. The access to work area 3 from the volume of workbench 2 situated beneath worktop 21 is provided by opening 22. Opening 22 is formed as a slit directed into the figure plane, whose dimensions are configured for the through-passage of articulated arms 41 of robot 4. Articulated arms 41 guide manipulators 42 on their extremities for processing structural elements C. Manipulator 42, which is provided on left articulated arm 41 and designed as a gripper, is suitable for gripping structural element C deposited in intermediate holder 23. Cup-shaped intermediate holder 23 is open on its two sides in parallel to the figure plane, whereby access for manipulator 42 is facilitated from beneath worktop 21. Intermediate holder 23 extends up to one or both edge(s) of worktop 21 in front of or behind the figure plane, so that intermediate holder 23 is also accessible there from an area outside work apparatus 1. Robot 4 comprises a base 43, which is movably arranged on a rail 44 mounted on baseplate 24 of workbench 2, as well as a height-adjustable stamp 45, on which the two articulated arms 41 rest. Due to the movability along rail 44 and along stamp 45, the action radius of robot 4 is expanded to reach all desired positions in work area 3 with manipulators 42, on the one hand, and to be able to completely withdraw robot 4 from work area 3 into the volume of workbench 2 situated beneath worktop 21. Controller 40 of robot 4 is also arranged on baseplate 24 within the volume of workbench 2. Workbench 2 resting on feet 25 is surrounded on by side panels 26 on all four sides beneath worktop 21, the side panel 26 abutted by intermediate holder 23 requiring a corresponding recess in the area of intermediate holder 23 to ensure the accessibility of intermediate holder 23 from an area outside work apparatus 1.

Figure 2:
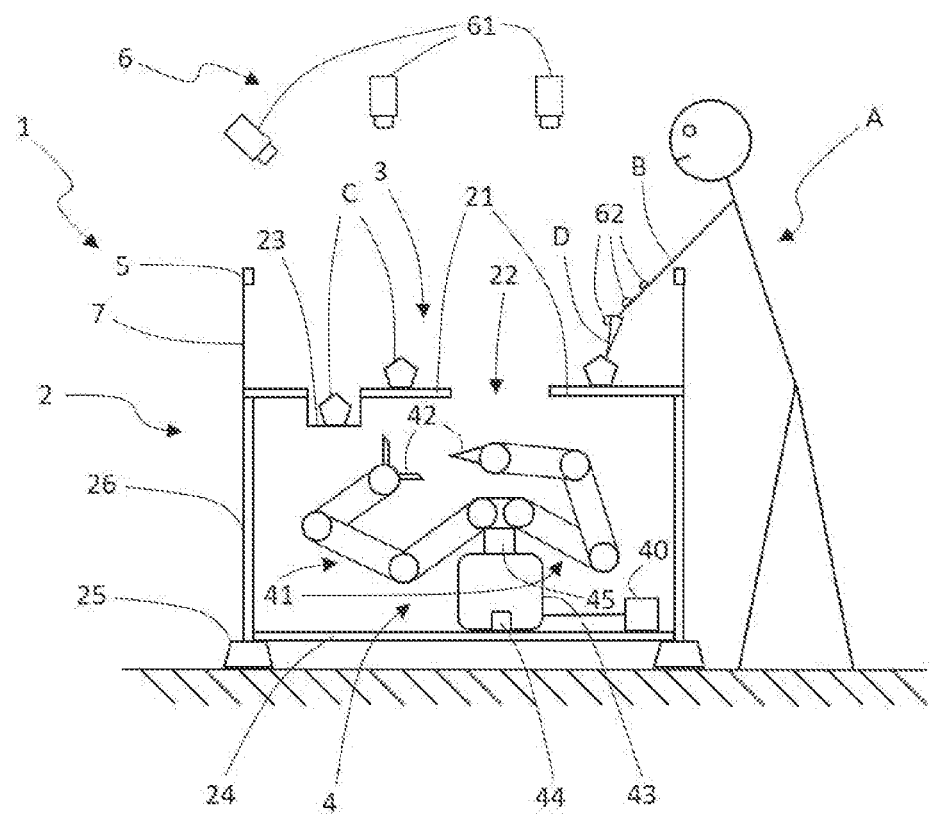
FIG. 2 shows a work apparatus according to the invention, including a person who carries out manual work steps in the collaborative area, and a robot arranged completely beneath the worktop.

FIG. 2 shows a cross-section of a work apparatus 1 according to the invention, including a person A who carries out manual work steps in collaborative work area 3, and including a robot 4 arranged completely beneath worktop 21. Light barrier system 5 is deactivated while carrying out the manual work steps. According to FIG. 1, collaborative work area 3 is limited upwardly by the highest position assumed by a part of robot 4 while carrying out the automatic work steps. To further monitor the manual work steps, illustrated work apparatus 1 is equipped with a sensor system 6, which detects the positions and movements of extremities B of person A carrying out the work steps. Sensor system 6 comprises a plurality of cameras 61 directed into work area 3, which continuously detect the position of markers 62, which are arranged on extremities B of person A, for example with the aid of a glove carrying markers 62, and which are also arranged on tool D. The data collected by sensor system 6 in this manner is processed by controller 40 of robot 4. The case that manual and automatic work steps are carried out in parallel in collaborative work area 3, i.e. that human extremities B and parts of robot 4 work simultaneously in work area 3, is therefore also possible in this work apparatus 1. Controller 40 uses the position and movement data continuously provided by sensor system 6 to adapt the actions of robot 4 to the manual work steps, whether to avoid industrial accidents, for example in the form of collisions, or to precisely control a scheduled interaction of robot 4 with person A. Reference is hereby made to the above description in FIG. 1 for the further reference numerals contained in FIG. 2.

Figure 3:
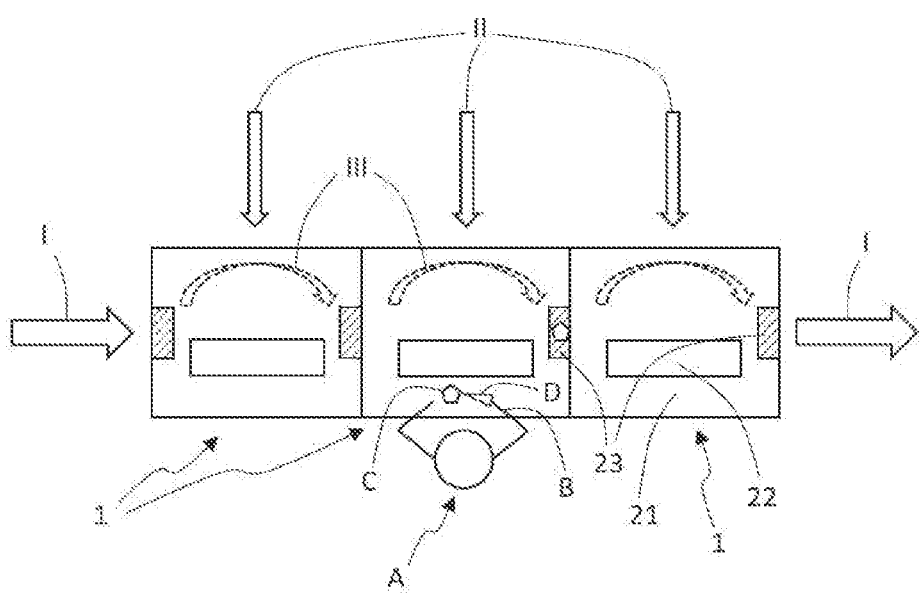
FIG. 3 shows a section of a production line, including work apparatuses according to the invention arranged one after the other.

FIG. 3 shows a section of a production line, including three work apparatuses 1 according to the invention arranged one after the other, viewed from above. Flow direction I of introduced and removed structural elements C runs from left to right in the figure plane. On each of work apparatuses 1, manual and automatic work steps are to be carried out on structural elements C, which also comprise the mounting of components supplied along flow direction II on structural elements C. The transport of structural elements C between work apparatuses 1 runs along flow directions III beneath worktops 21 from one intermediate holder 23 to next intermediate holder 23. Intermediate holders 23 are accessible by robots 4, without them having to penetrate through openings 22 into work area 3 above worktops 21. It is thus possible for person A to reach into work area 3 with his/her extremity B at the same time that a structural element is being transported in this manner, and to carry out manual work steps using tool D without having to fear an industrial accident with robot 4.

The design of the invention is not limited to the preferred exemplary embodiment specified above. Instead, a number of variants are conceivable, which make use of the illustrated approach, even in fundamentally different designs. All features and/or advantages arising from the claims, the description or the drawings, including structural details, spatial arrangements and method steps. may be essential to the invention individually as well as in a wide range of combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A work apparatus for semi-automatically carrying out work steps, the work apparatus comprising:
   a workbench, comprising:
      a worktop; and
      a collaborative work area, arranged above the worktop, in which work steps are simultaneously carried out manually and automatically;
   a robot to carry out the automatic work steps, the robot being arranged beneath the worktop, the robot comprising an articulated arm; and
   at least one opening provided in the worktop, through which the work area is accessible for the robot,
   wherein the collaborative work area is accessible to both the robot and a user, and
   wherein the collaborative work area is closed off laterally by side panels such that the work steps are carried out manually, by the user, and automatically, by the robot, within the side panels.

2. The work apparatus according to claim 1, wherein the workbench is dimensioned such that the robot is accommodated in the installation volume of the workbench beneath the worktop.

3. The work apparatus according to claim 1, wherein the worktop comprises at least one intermediate holder, which is situated beneath the work area and which is accessible from the work area from the area above the worktop as well as from an area outside the work apparatus.

4. The work apparatus according to claim 3, wherein the intermediate holder is arranged on an edge such that, in a series arrangement of a plurality of work apparatuses, the intermediate holders are each also accessible for the robot of the adjacent work apparatus.

5. The work apparatus according to claim 1, wherein a light barrier system is present, with the aid of which the penetration of objects into the work area from an area above the worktop is detectable.

6. The work apparatus according to claim 5, wherein the light barrier system is connected to a controller of the robot, and the robot is brought to a standstill and/or placed in another suitable safety mode by the controller if the light barrier system detects the penetration of an object into the work area and if at least one part of the robot is situated within the work area.

7. The work apparatus according to claim 1, wherein a sensor system is provided, with the aid of which the positions and the movements of body parts of a person situated in the work area are detectable when carrying out the manual work steps.

8. The work apparatus according to claim 7, wherein the automatic work steps carried out by the robot are adapted by the controller to the positions and movements detected by the sensor system of body parts of the person situated in the work area when carrying out the manual work steps for the purpose of avoiding collisions or for the purpose of scheduled interaction.

9. The work apparatus according to claim 1, wherein the articulated arm includes a manipulator disposed at an end of the articulated arm.

10. The work apparatus according to claim 9, wherein the manipulator is a gripper.

11. The work apparatus according to claim 1, wherein the articulated arm is one of a plurality of articulated arms.

12. The work apparatus according to claim 1, wherein the robot comprises a base movably disposed on a rail.

13. The work apparatus according to claim 1, wherein the robot comprises a height adjuster.

14. The work apparatus according to claim 1, wherein the articulated arm is configured to move through the at least one opening.

15. The work apparatus according to claim 1, wherein an entirety of the collaborative work area is accessible to both the robot and a user.

16. The work apparatus according to claim 1, wherein the robot is configured to be arranged entirely beneath the worktop.

17. The work apparatus according to claim 1, where the collaborative work area is accessible by the user from an open top of the work apparatus.

18. The work apparatus according to claim 1, wherein the collaborative work area is a continuously open area accessible to both the robot and the user.

19. A work apparatus, comprising:
   a workbench, comprising:
      a worktop; and
      a collaborative work area, arranged above the worktop, the work area being accessible by a user;
   a robot, configured to be arranged entirely beneath the worktop, the robot comprising an articulated arm; and
   an opening provided in the worktop, through which the work area is accessible for the robot,
   wherein an entirety of the collaborative work area is accessible to both the robot and a user.

20. A production line, comprising:
   a plurality of work apparatuses arranged in series, each of the plurality of work apparatuses comprising:
      a workbench, comprising:
         a worktop; and
            a collaborative work area, arranged above the worktop, the work area being accessible by a user;
      a robot, configured to be arranged entirely beneath the worktop, the robot comprising an articulated arm; and
      an opening provided in the worktop, through which the work area is accessible for the robot,
   wherein an entirety of the collaborative work area is accessible to both the robot and a user.

21. A work apparatus for semi-automatically carrying out work steps, the work apparatus comprising:
   a workbench, comprising:
      a worktop; and
      a collaborative work area, arranged above the worktop, in which work steps are simultaneously carried out manually and automatically;
   a robot to carry out the automatic work steps, the robot being configured to be arranged entirely beneath the worktop, the robot comprising an articulated arm; and
   at least one opening provided in the worktop, through which the work area is accessible for the robot, wherein an entirety of the collaborative work area is accessible to both the robot and a user.

* * * * *